(12) United States Patent
Stoner

(10) Patent No.: US 6,318,637 B1
(45) Date of Patent: Nov. 20, 2001

(54) MULTI-FOCAL LENGTH IMAGING BASED PORTABLE DATAFORM READER

(75) Inventor: Paul Douglas Stoner, North Canton, OH (US)

(73) Assignee: Telxon Corporation, Holtsville, NY (US)

(*) Notice: Subject to any disclaimer, the term of this patent is extended or adjusted under 35 U.S.C. 154(b) by 0 days.

(21) Appl. No.: 09/477,259

(22) Filed: Jan. 4, 2000

Related U.S. Application Data

(63) Continuation of application No. 08/982,552, filed on Dec. 2, 1997, now Pat. No. 6,053,408.

(51) Int. Cl.⁷ .................................................. G06K 7/10
(52) U.S. Cl. .............................. 235/472.01; 235/462.24
(58) Field of Search ......................... 235/462.01, 462.21, 235/462.22, 462.23, 462.24, 462.31, 472.01, 454, 462.25, 462.26, 462.41

(56) References Cited

U.S. PATENT DOCUMENTS

| | | | | |
|---|---|---|---|---|
| 4,831,275 | * | 5/1989 | Drucker | 235/462.23 X |
| 4,843,222 | * | 6/1989 | Hochgraf | 235/462.22 |
| 4,877,949 | * | 10/1989 | Danielson et al. | 235/462.21 |
| 5,071,207 | | 12/1991 | Ceglio et al. | 359/15 |
| 5,198,648 | * | 3/1993 | Hibbard | 235/462.24 |
| 5,308,966 | * | 5/1994 | Danielson et al. | 235/462.23 |
| 5,325,217 | * | 6/1994 | Nagler et al. | 358/506 |
| 5,563,658 | * | 10/1996 | Parulski et al. | 348/350 |
| 5,576,529 | * | 11/1996 | Koenck et al. | 235/462.47 |
| 5,627,366 | * | 5/1997 | Katz | 235/462.23 X |
| 5,640,001 | * | 6/1997 | Danielson et al. | 235/462.23 |
| 5,710,416 | | 1/1998 | Belknap et al. | 235/383 |
| 5,777,308 | * | 7/1998 | Shimizu et al. | 235/462.41 X |
| 5,796,089 | * | 8/1998 | Marom | 235/462.24 |
| 5,814,803 | | 9/1998 | Olmstead et al. | 235/462.01 |
| 5,818,023 | * | 10/1998 | Meyerson et al. | 235/462.01 X |
| 5,914,478 | * | 6/1999 | Bridgelall | 235/462.25 |
| 5,969,325 | * | 10/1999 | Hecht et al. | 235/462.25 X |
| 5,988,504 | * | 11/1999 | Smitt | 235/462.25 X |
| 6,053,408 | * | 4/2000 | Stoner | 235/462.22 |
| 6,123,261 | * | 9/2000 | Roustaei | 235/462.01 |
| 6,152,368 | * | 11/2000 | Olmstead et al. | 235/454 |
| 6,170,749 | * | 1/2001 | Goren et al. | 235/462.41 X |

FOREIGN PATENT DOCUMENTS

| | | | |
|---|---|---|---|
| 2 683 109 | * | 4/1993 | (FR) . |
| 52-44653 | * | 4/1977 | (JP) . |
| 62-34114 | * | 2/1987 | (JP) . |

\* cited by examiner

*Primary Examiner*—Karl D. Frech
*Assistant Examiner*—Jared J. Fureman
(74) *Attorney, Agent, or Firm*—Amin & Turocy, LLP

(57) ABSTRACT

A dataform reader which includes a hand-portable sized housing and an image assembly included within the housing. The image assembly includes a lens array or other optical system for obtaining a plurality of images of the dataform when positioned a given distance from the dataform. Each of the plurality of images is obtained relative to a different respective best focus length from the image assembly. The dataform reader further includes processing circuitry within the housing for selecting, from among the plurality of images, an image satisfying a predefined focus criteria. The image is selected based upon an evaluation of a sample from each of the images. The selected image may then be decoded.

26 Claims, 8 Drawing Sheets

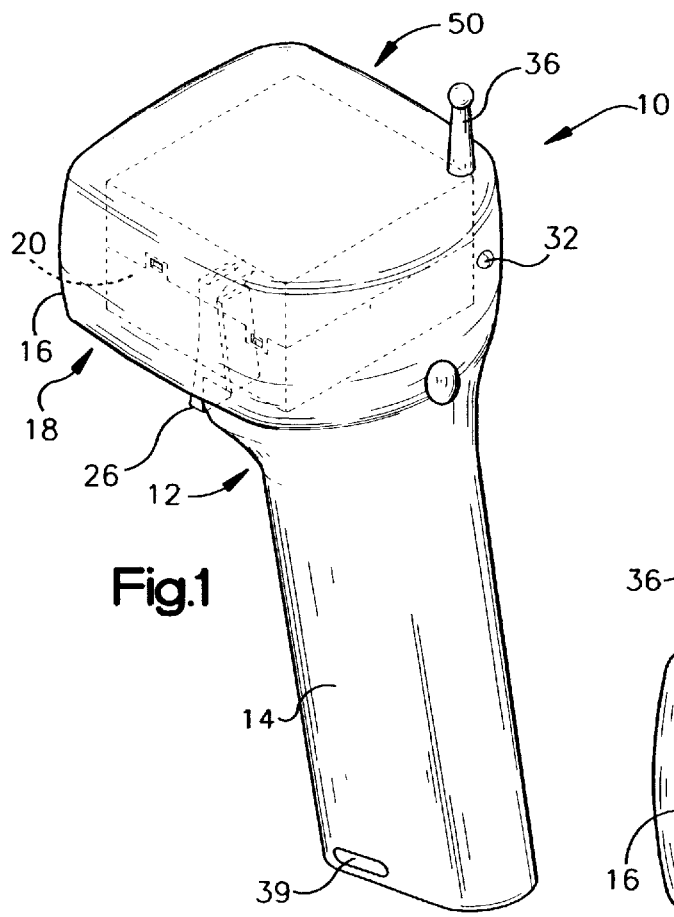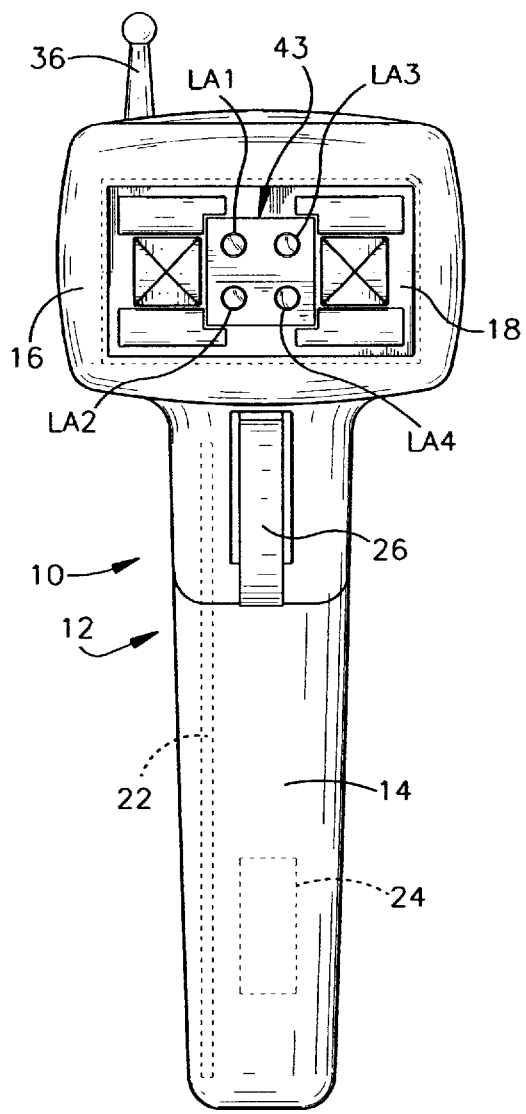

MULTI-FOCAL LENGTH IMAGING BASED PORTABLE DATAFORM READER

The following application is a continuation of U.S. patent application Ser. No. 08/982,552, filed Dec. 2, 1997, now issued as U.S. Pat. No. 6,053,408.

FIELD OF THE INVENTION

The present invention relates to a portable data collection device including an imaging based dataform reader and, more particularly, to a portable data collection device including an imaging based dataform reader utilizing multiple focal lengths to capture and identify an imaged dataform.

BACKGROUND OF THE INVENTION

Portable data collection devices are widely used in manufacturing, service and package delivery industries to perform a variety of on-site data collection activities. Such portable data collection devices often include integrated bar code dataform readers adapted to read bar code dataforms affixed to products, product packaging and/or containers in warehouses, retail stores, shipping terminals, etc. for inventory control, tracking, production control and expediting, quality assurance and other purposes. Various bar code dataform readers have been proposed for portable data collection devices including laser scanners and one dimensional (1D) charge coupled device (CCD) imaging assemblies, both of which are capable of reading 1D bar code dataforms, that is, bar codes consisting of a single row of contrasting black bars and white spaces of varying widths. Both laser scanners and CCD imaging assemblies are also capable of reading a "stacked" two dimensional (2D) bar code dataforms, such as PDF417, which is comprised of a plurality of adjacent rows of bar code data. The stacked 2D bar code PDF417 includes row indicator patterns utilized by the dataform reader for vertical synchronization to permit reading successive rows of bar code data.

A two dimensional (2D) imaging based dataform reader has been proposed in U.S. application Ser. No. 08/544,618, filed Oct. 18, 1995, now issued as U.S. Pat. No. 5,702,059 and entitled "Extended Working Range Dataform Reader Including Fuzzy Logic Image Control Circuitry". The 2D dataform reader disclosed in application Ser. No. 08/544,618, which is assigned to the assignee of the present application, includes an imaging assembly having a two dimensional array of photosensors adapted to read 2D bar code dataforms (e.g., PDF417, SuperCode, etc.) with vertical synchronization row indicator patterns as well as matrix dataforms (e.g., MaxiCode, DataMatrix, etc.) which do not include vertical synchronization patterns. The individual photosensors correspond to image picture elements or pixels of the resulting image generated with the photosensors are read out after an exposure period or periods. The 2D dataform reader disclosed in application Ser. No. 08/544,618 utilizes an open loop feedback control system including fuzzy logic circuitry to determine proper exposure time and gain parameters for a camera assembly. Application Ser. No. 08/544,618 is incorporated in its entirety herein by reference.

A problem associated with dataform readers in the past has been that the readers are designed to read dataforms located within a limited range from the reader. For example, a dataform reader may be designed to read dataforms located within the range of 3 inches to 12 inches from the reader. Unfortunately, oftentimes it is necessary to read a dataform which is located a greater distance away (e.g., several feet away). However, the dataform reader is unable to image the dataform satisfactorily at such range. This requires that the operator gain closer access to the dataform which at times can be inconvenient or impossible. As an example, in a warehouse an operator may have to utilize a ladder or lift in order to get close enough to a dataform on a shelf so that the dataform may be read.

In view of the aforementioned shortcomings associated with conventional dataform readers, there is a strong need in the art for a dataform reader which is capable of reading dataforms over a wider range of distances. In particular, there is a strong need for a dataform reader which quickly and accurately captures and identifies an imaged dataform at relatively low cost.

SUMMARY OF THE INVENTION

According to one aspect of the invention, a dataform reader is provided for reading a dataform. The dataform reader includes a hand-portable sized housing; an image assembly included within the housing, the image assembly including means for obtaining a plurality of sets of image data representing the dataform when positioned a given distance from the dataform, each of the plurality of sets of image data being obtained relative to a different respective best focus length from the image assembly; and means within the housing for selecting, from among the plurality of sets of image data, image data satisfying a predefined focus criteria.

According to another aspect of the invention, a method is provided for reading a dataform using a portable dataform reader. The method includes the steps of obtaining a plurality of sets of image data of the dataform when the portable dataform reader is positioned a given distance from the dataform, each of the plurality of sets of image data being obtained relative to a different respective best focus length from the image assembly; and selecting, from among the plurality of sets of image data, image data satisfying a predefined focus criteria.

These and other aspects, features and advantages of the invention will become better understood from the detailed description of the preferred embodiments of the invention which are described in conjunction with the accompanying drawings.

BRIEF DESCRIPTION OF THE DRAWINGS

FIG. 1 is a perspective view of a portable data collection device of the present invention;

FIG. 2 is a front elevation view of the portable data collection device of FIG. 1;

DETAILED DESCRIPTION

Figure 3:
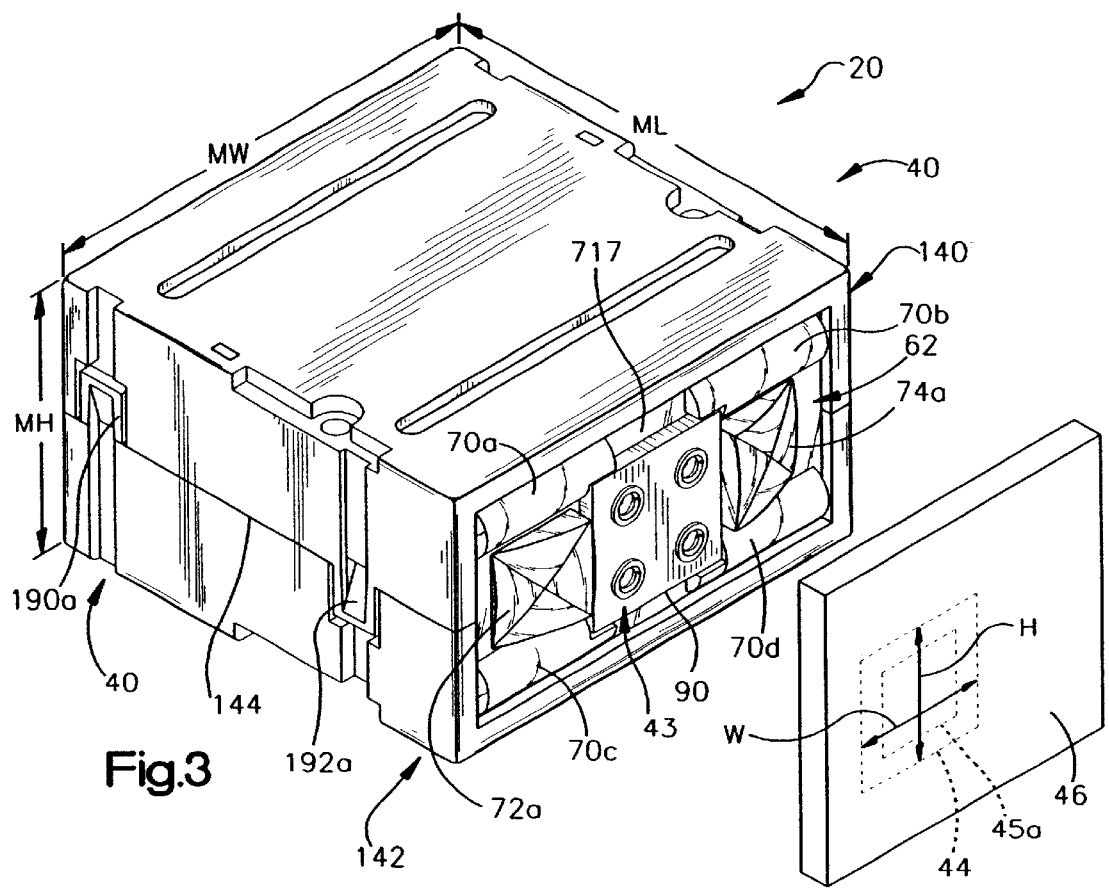
FIG. 3 is a perspective view of a modular imaging assembly of the portable data collection device of the present invention, the modular portion shown imaging a target dataform affixed to a target item.

The present invention will now be described with reference to the drawings wherein like reference numerals are used to refer to like elements throughout.

Turning to the drawings, a portable, hand held data collection device in accordance with the present invention is shown generally at 10 in FIGS. 1 and 2. The portable data collection device includes a two dimensional (2D) photosensor array imaging assembly 18 which is capable of imaging a target dataform 45a located within an imaging target area 44 of the imaging assembly. As will be described more fully below in connection with FIGS. 3–7, the imaging assembly 18 utilizes a novel multi-focal length imaging process for reading dataforms. This enables the data collection device to perform a dataform read at a distance over a much broader range as compared to conventional readers.

Configuration of the Portable Data Collection Device 10

The data collection device 10 includes a housing 12 defining an interior region. The housing 12 includes a gripping portion 14 sized to be grasped in the hand of an operator and an angled snout 16 extending from the gripping portion 14. With specific reference to FIGS. 1 and 2, the snout 16 includes an opening through which a portion of the imaging assembly 18 extends. The imaging assembly 18 includes a modular camera assembly 20 and a control and decoder board 22 (shown in phantom in FIG. 2) electrically coupled to electronic circuitry of the modular camera assembly 20. The control and decoder board 22 is supported within the gripping portion 14 of the housing 12. Also supported within the housing gripping portion 14 is a power source 24 (again represented in phantom in FIG. 2) such as a rechargeable battery for supplying operating power to the portable data collection device 10.

A dataform reading trigger switch or actuator 26 extends through an opening in the gripping portion 14. The dataform reading trigger 26 is positioned to be depressed by an index finger of the operator while the gripping portion 14 of the housing 12 is held in the operator's hand.

The gripping portion 14 also includes a small opening through which a distal portion of an indicator light emitting diode (LED) 32 is visible. The indicator LED 32 alternates between three colors. The color green is displayed by the indicator LED 32 when the device 10 is on standby, ready for use. The color orange is displayed with the device 10 has successfully completed an operation such as decoding a target dataform. The color red is displayed when the device 10 is not ready to perform an operation. Finally, the housing 12 includes an opening through which a radio antenna 36 extends.

A serial data port 39 extends through an opening in the gripping portion 14. The port 39 permits downloading of data stored in a memory within the device 10. The interior region of the housing 12 supports the imaging assembly 18 and other electronic circuitry to be described below.

Configuration and Operation of the Modular Camera Assembly 20

Figure 4:
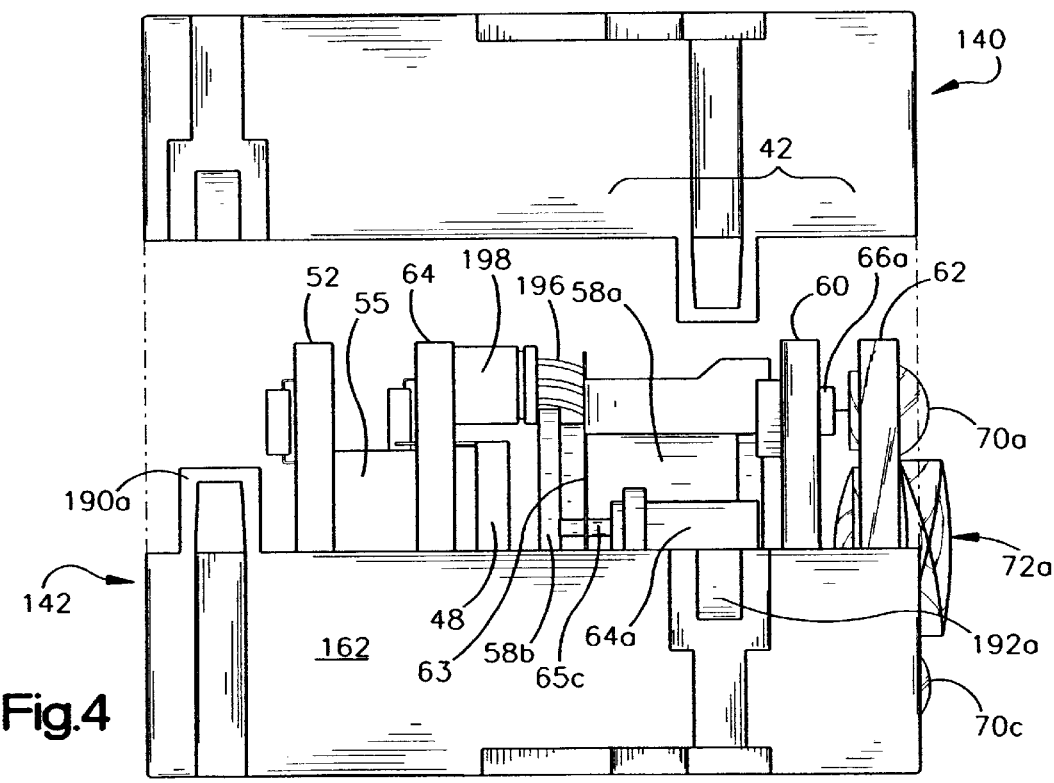
FIG. 4 is a side elevation view of the modular imaging assembly of FIG. 3 with the upper half of the housing removed.
Figure 5:
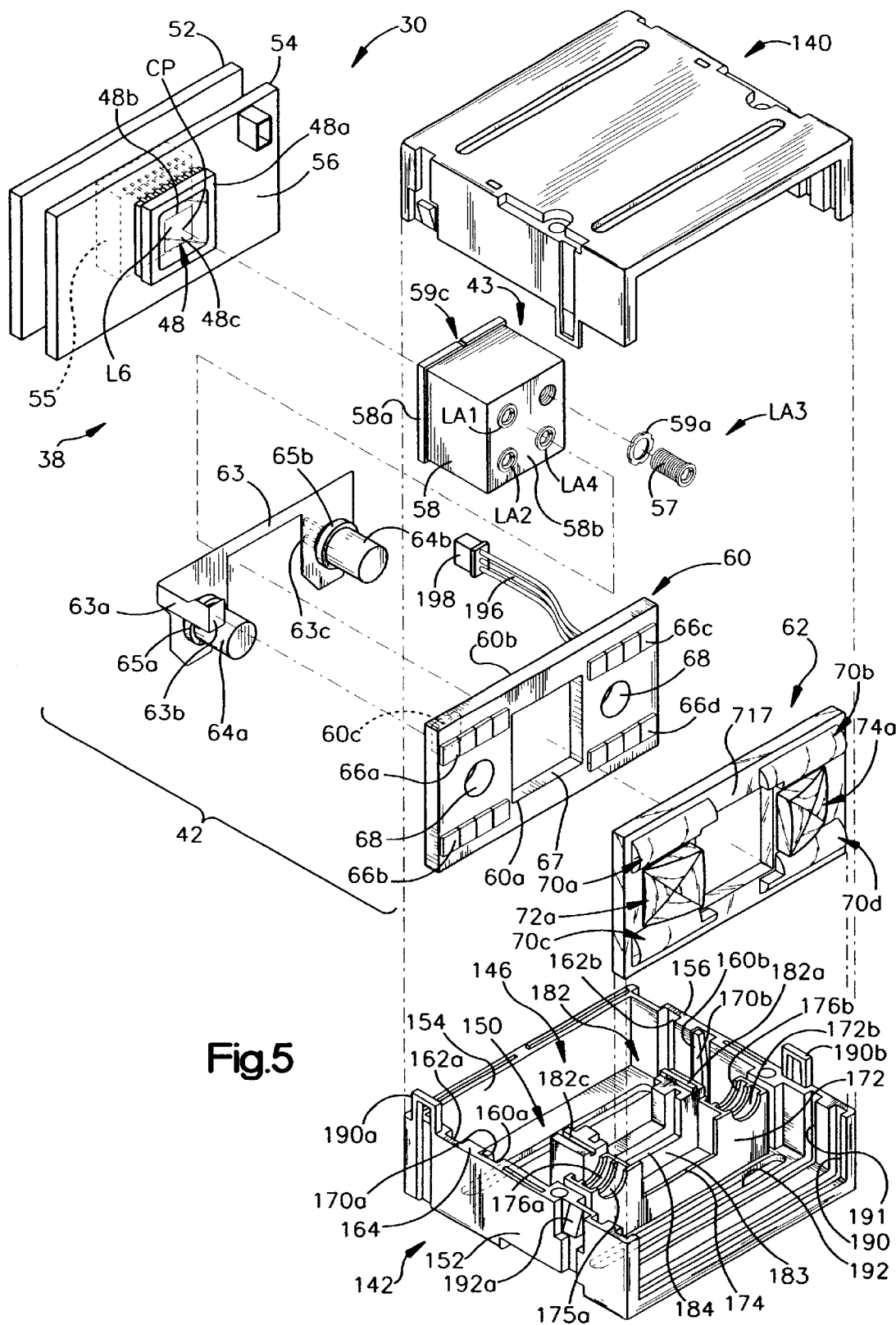
FIG. 5 is an exploded perspective view of the modular imaging assembly of FIG. 3.

FIGS. 3–5 show perspective, side elevation, and exploded perspective views of the modular camera assembly 20 of the imaging assembly 18. It can be seen that the modular camera assembly 20 includes a housing 40 which supports an illumination assembly 42 and a camera assembly 38. The camera assembly 38 includes a two dimensional photosensor array 48 mounted on a surface 56 of a printed circuit board 54. The printed circuit board 54 and another printed circuit board 52 support camera circuitry that, when actuated, generates selected pixel data (shown schematically in FIG. 8). The modular camera assembly 20 includes a lens array 43 which focuses multiple images of a dataform within the imaging target area 44, as obtained along respective optical paths with different best focus lengths, onto respective regions of a 2D photosensor array 48 (shown schematically in FIG. 7 as discussed more fully below). Specifically, reflected light from the imaging target area 44 is focused by the lens array 43 as separate images onto different respective regions of an outwardly facing, light receiving surface 48b of the photosensor array 48. The photosensor array 48 is part of a surface mounted integrated circuit (IC) chip 48a.

Structure of Photosensor Array 48

The photosensor array light receiving surface 48b includes an array of 2048×2048 pixels each of which are selectively addressable. An exemplary photosensor array 48 for use in accordance with the present invention is Image Sensor Model FUGA22 which is commercially available from Imec, located in Leuven, Belgium.

Imaging Target Area 44 of Board Camera Assembly 38

The imaging target area 44 (FIG. 3) is defined by a field of view of the board camera assembly 38 and is represented in FIG. 3 by the dimensions labeled "H" (for height of imaging target area 44) and "W" (for width of the imaging target area 44). The illumination assembly 42 as shown in FIG. 5 includes four illumination optic portions 66a, 66b, 66c, and 66d (LED arrays) which project a uniform intensity distribution of illumination through corresponding illumination directing or illumination focusing elements 70a–70d across the imaging target area 44. The illumination assembly 42 also includes a targeting arrangement including targeting LEDs 64a, 64b, which, when energized, project illumination through first and second targeting optics 72a, 74a thereby generating a crosshair targeting illumination pattern to aid in aiming the device 10. To avoid image distortion, the targeting pattern is turned off by the imaging assembly 18 when the image frames of the imaging target area 44 are being captured.

Additional details regarding a suitable illumination assembly 42 can be found in commonly assigned, co-pending application U.S. Ser. No. 08/961,096 entitled "Hand Held Dataform Reader Utilizing Binarization Process for Dataform and Signature Area Capture" filed on Oct. 29, 1997, the disclosure of which is incorporated herein by reference.

The imaging assembly 18 is capable of decoding a target dataform 45a affixed to the item 46 as represented in FIG. 3. The target dataform 45a may be a one dimensional bar code dataform such as Codabar, Code 39, Code 93, Code 128, Interleaved 2 of 5, and UPC/EAN; a two dimensional bar code dataform such as PDF417 and SuperCode; or a matrix dataform such as MaxiCode and DataMatrix.

Modular Camera Assembly Housing 40

As is shown in FIGS. 3–5, the housing 40 includes an upper portion 140 and a symmetrical lower portion 142. The upper and lower portions 140, 142 are advantageously identically shaped and positioned symmetrically about a part line 144 and define an interior region 146 (FIG. 5) in which components of the modular camera assembly 20 are supported. Since the upper and lower portions 140, 142 are symmetrical, only the construction of the lower portion 142 will be discussed with the understanding that the same construction and features are present in the mating upper portion 140.

As can best be seen in FIG. 5, the housing lower portion 142 includes a substantially flat base 150 and three side walls 152, 154, 156 extending perpendicularly from the base 150. An inner surface of the side wall 152 includes two spaced apart slots 160a, 162a extending from an upper edge 164 of the housing lower portion 142 defined by the side walls 152, 154, 156 to an inner surface 166 of the base 150. Similarly, an inner surface of the side wall 156 includes matching spaced apart slots 160b, 162b extending from the upper edge 164 of the housing lower portion 142 to the inner surface 166 of the base 150.

The modular camera assembly 20 includes circuitry mounted on a set of two parallel, spaced apart rear and front printed circuit boards 52, 54 affixed to a spacer element 55. The slots 162a, 162b receive and securely hold the rear printed circuit board 52 while the slots 160a, 160b receive the front printed circuit board 54. Mounted on a front surface 56 of the front printed circuit board 54 is the 2D photosensor array IC chip 48a. The lens array 43 must be precisely aligned with the photosensor array 48 to insure proper imaging of the imaging target area 44 as is discussed below in connection with FIGS. 6, 6A and 7.

The housing lower portion 142 also includes first and second supports 172, 182 extending upwardly from a slightly raised portion of the base 150. The first support 172 includes a central portion 174 with rectangular recess flanked by two outerlying portions 175a, 175b having small semicircular recesses. The central portion 174 supports a lower half of a square main body 58 of the lens array 43. The two smaller outerlying portions support respective targeting light emitting diodes 73a, 73b of the illumination assembly 42. The targeting LEDs 64a, 64b are cylindrically shaped and include enlarged diameter base portions 65a, 65b which fit into inwardly stepped semicircular recesses 176a, 176b of the outerlying portions 175a, 175b. A first end portion 183 of the second support 182 includes a rectangular recess which supports the main body 58. Just inward of the end portion 183 is a portion 184 defining another rectangular recess having a slightly larger width than the recess of the end portion 183. The portion 184 is sized to receive an outwardly flared end portion 58a of the main body 58 and thereby position it precisely with respect to the photosensor array 48. The outwardly flared end portion 58a of the main body 58 includes two small cut out portions 59c (only one of which can be seen in FIG. 9). One of the cut out portions 59c fits onto a raised nub of the rectangular shaped portion 184 to prevent the main body 58 from shifting within the housing 40. The other cut out portion 59c, of course, fits onto an identical nub (not shown) of the upper housing portion 140 which is identical in shape and configuration to the lower housing portion 142.

Additional details regarding the housing 40 are found in the aforementioned application Ser. No. 08/961,096, entitled "Hand Held Dataform Reader Utilizing Binarization Process for Dataform and Signature Area Capture". The housing described in such application is virtually identical to the housing in the present application with the exception of the recesses formed to support the square shaped main body 58.

Lens Assembly 43

Figure 6:
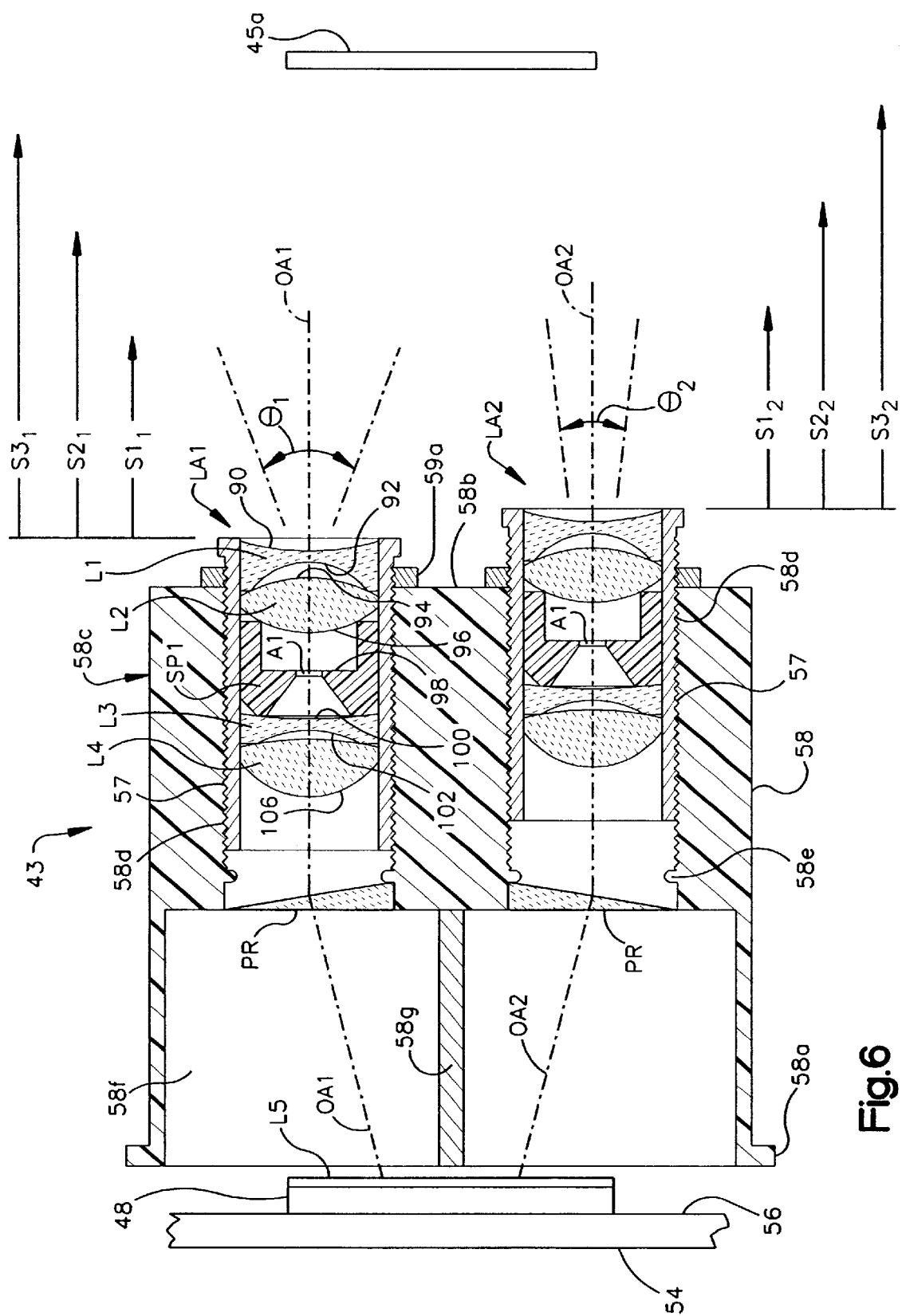
FIG. 6 is a schematic cross-sectional view of the lens array section of the modular imaging assembly in accordance with the present invention.
Figure 6A:
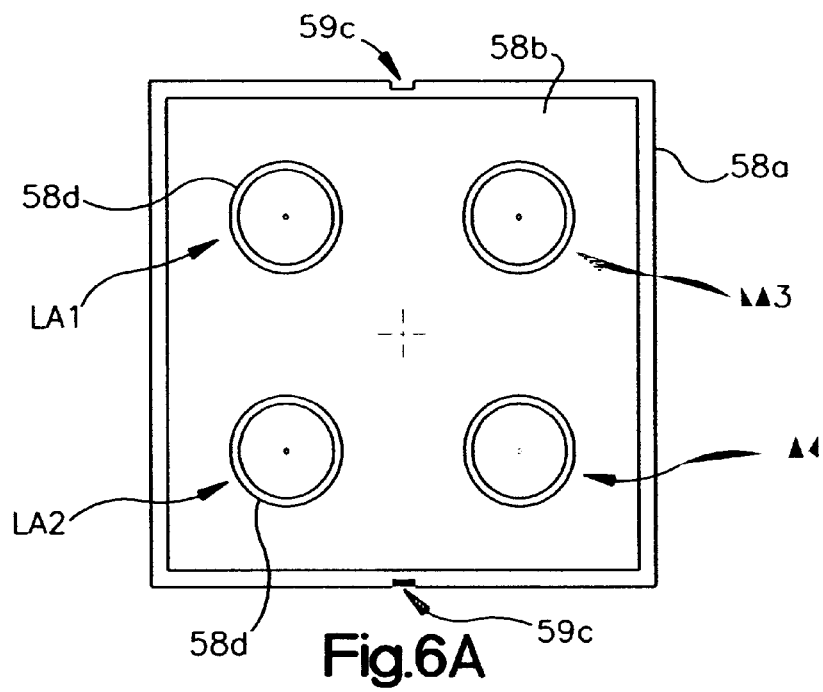
FIG. 6A is a front view of the lens array section in accordance with the present invention.

Referring to FIGS. 6 and 6A, a cross sectional view and front view of the lens array 43 are respectively shown. In the exemplary embodiment, the lens array 43 is made up of the main body 58 supporting four separate lens assemblies LA1, LA2, LA3 and LA4. The front face 58b of the main body 58 is square and is divided nominally into four separate quadrants. Centered in each quadrant is a corresponding lens assembly LA1–LA4, each of which are directed towards the target dataform 45a during a read dataform operation.

Each lens assembly LA1–LA4 has a corresponding optical axis OA1–OA4 which extends outwardly from the optical device 10 towards the target dataform 45a. These optical axes OA1–OA4 may be substantially parallel for lens systems designed to be focused relatively far away, but may be directed generally inwardly towards a geometric center axis for lens systems focused relatively close in. When the device 10 is pointed at the target dataform 45a, each lens assembly LA1–LA4 is designed to form an image of the target dataform 45a onto a respective quadrant of the photosensor array 48. In this manner, four different images of the target dataform 45a are formed simultaneously on the photosensor array 48.

The main body 58 is made of light weight metal, plastic, or the like, and has a front section 58c having threaded bores 58d therethrough along the optical axis of each corresponding lens assembly. The threaded bores 58d are designed to receive the respective lens assemblies. A stop 58e is included at the base of each bore 58d to prevent the respective lens assembly from being screwed in too far so as to potentially damage the interior optics/photosensor array 48.

Describing lens assembly LA1 in detail, the lens assembly includes a cylindrical shroud 57 which houses lenses L1, L2, L3, L4 and a spacer member do SP1 with a small central aperture A1 (e.g., 1.17 mm. in diameter). The outer surface of the shroud 57 is threaded, and the diameter of the shroud 57 is such that the shroud 57 may be theadedly engaged with the bores in the main body 58. By screwing the lens assembly LA1 inward or outward, the distance between the photosensor array 48 and the various lenses L1–L4 can be adjusted. This allows each of the lens assemblies LA1–LA4 to be set at a slightly different distance from the array 48. As will be appreciated, this results in each of the lens assemblies LA1–LA4 having a different best focus length at which the target dataform 45b will be optimally focused. Preferably the lens assembly LA1–LA4 designed to have a longer best focus length is also designed to have a narrower field of view as compared to another lens assembly LA1–LA4 designed to have a shorter best focus length. For example, FIG. 6 illustrates lens assembly LA2 having a longer best focus distance than lens assembly LA1, with lens assembly LA2 having a field of view $\theta_2$ and lens assembly LA1 having a field of view $\theta_1$, where $\theta_2 < \theta_1$. By utilizing a lens assembly with a narrower field of view, dataforms located a further distance from the device 10 will still tend to be imaged onto a comparable area of the photosensor array 48.

Figure 7:
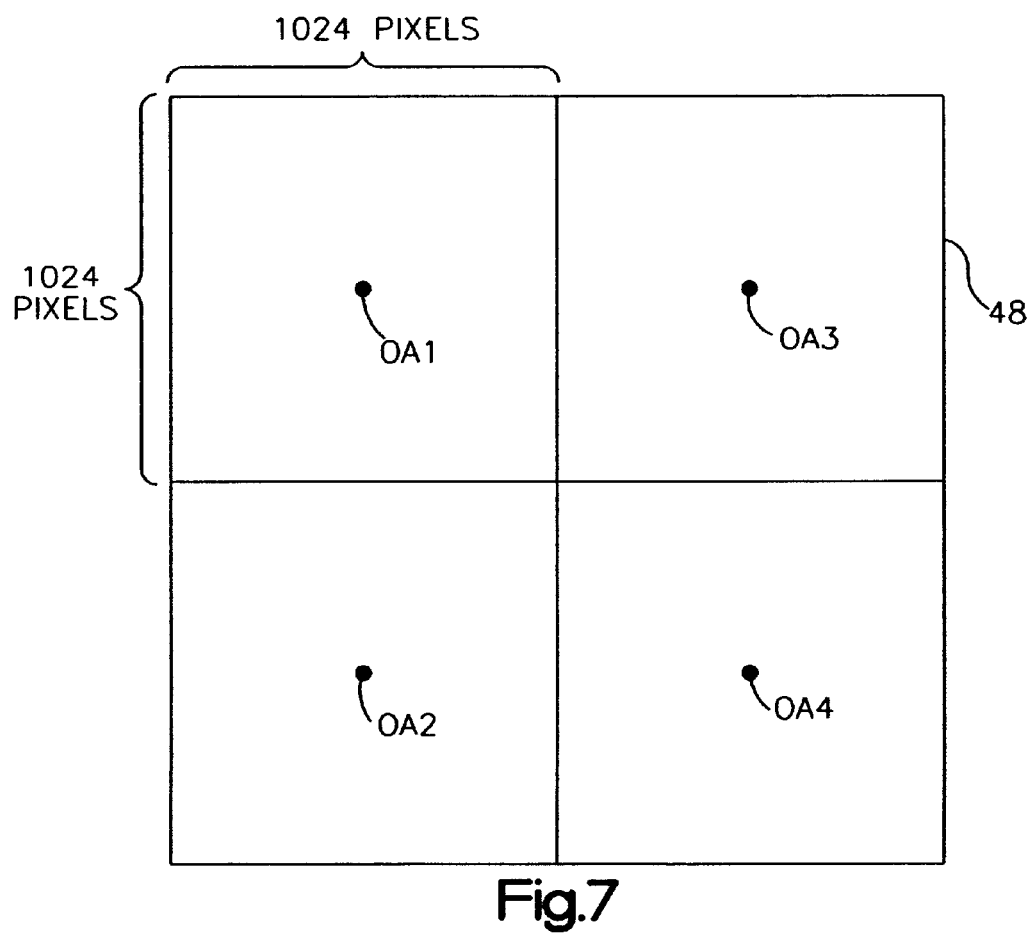
FIG. 7 is a schematic illustration of a photosensor array included in the modular imaging assembly in accordance with the present invention.

Included at the base of each bore 58d is a prism PR which serves to redirect the optical axis OA of the respective lens assembly LA1–LA4 to the center of a corresponding quadrant in the photosensor array 48. For example, FIG. 7 illustrates how the photosensor array 48 may be nominally sectioned into four separate quadrants. Each quadrant comprises 1024×1024 pixels. The optical axes OA1–OA4 of each of the respective lens assemblies LA1–LA4 are directed by a prism PR towards a corresponding center of one of the quadrants on the photosensor array 48 as represented in FIG. 7.

A lens L5 is supported by an upper surface of the photosensor array 48. Thus, independent of the prism PR there are eleven optic surfaces (including the portion of the spacer member SP1 defining the aperture A1) labeled 90, 92, 94, 96, 98, 100, 102, 104, 106, 108, 110 in the lens assembly LA1. The lens assembly LA1 also includes a lock nut 59*a*. The lock nut 59*a* includes internal threads which thread onto external threads of the shroud 57 in order to lock the shroud 57 in a desired position.

Each of the other lens assemblies LA2–LA4 have similar configurations to that of lens assembly LA1 so additional detail will be omitted. The primary difference is that the placement of each lens assembly along its optical axis relative to the photosensor array 48 and/or the selection of the lenses included in each assembly is designed such that the corresponding best focus lengths for forming an image of the target dataform 45*a* on the photosensor 48*a* are different. The main body 58 includes a vertical partition 58*f* and horizontal partition 58*g* for reducing crosstalk amongst light from the different quadrants/lens assemblies LA1–LA4.

Each lens assembly LA1–LA4 is designed to have an acceptable range in which it can successfully image the target dataform 45*b* with sufficient focus to be decoded. Such range is defined by distances S1n and S3n, with optimum focus occurring at S2n, where n=1 to 4 for the respective lens assemblies. Ideally, the ranges S1n to S3n for the respective lens assemblies LA1–LA4 overlap to form a continuos range up to several feet long over which at least one of the lens assemblies LA1–LA4 can image the target dataform 45*a* a given distance away onto the photosensor array 48 with sufficient focus to permit decoding. Also, the provision of multiple assemblies LA1–LA4 permits the respective apertures A1 in the assemblies to be larger. This means that more light is received by the respective assemblies, allowing for a reduction in power used for illumination of the target dataform 45*a*.

The lock nuts 59*a* facilitate precise positioning of the lenses L1, L2, L3, L4 with respect to each of the lens assemblies LA1–LA4 with respect to the longitudinal displacement of the lenses along their optical axis OA1–OA4. The precise positioning of the lenses L1, L2, L3, L4, L5 with respect to the photosensor array 48 permits the sharpest possible image of the target dataform 45*a* or target signature area 45*b* to be directed on the center point of the respective quadrant on the light receiving surface of the photosensor array 48.

The particular dimensions, focal lengths, etc. of the individual lenses in each lens assembly LA1–LA4 will of course depend on the desired best focus distance, suitable range, field of view, etc., as well as the size of the sphotosensor as will be appreciated. It will be apparent based on the disclosure herein to those having ordinary skill in the art how to make the lens assemblies LA1–LA4 with the appropriate optical properties. Accordingly, further detail is omitted.

Illumination Assembly 42

Additional details regarding the illumination assembly 42 can be found in the aforementioned co-pending application U.S. Ser. No. 08/961,096 entitled "Hand Held Dataform Reader Utilizing Binarization Process for Dataform and Signature Area Capture" filed on Oct. 29, 1997, the disclosure of which having been incorporated herein by reference.

Image Processing

Figure 8:
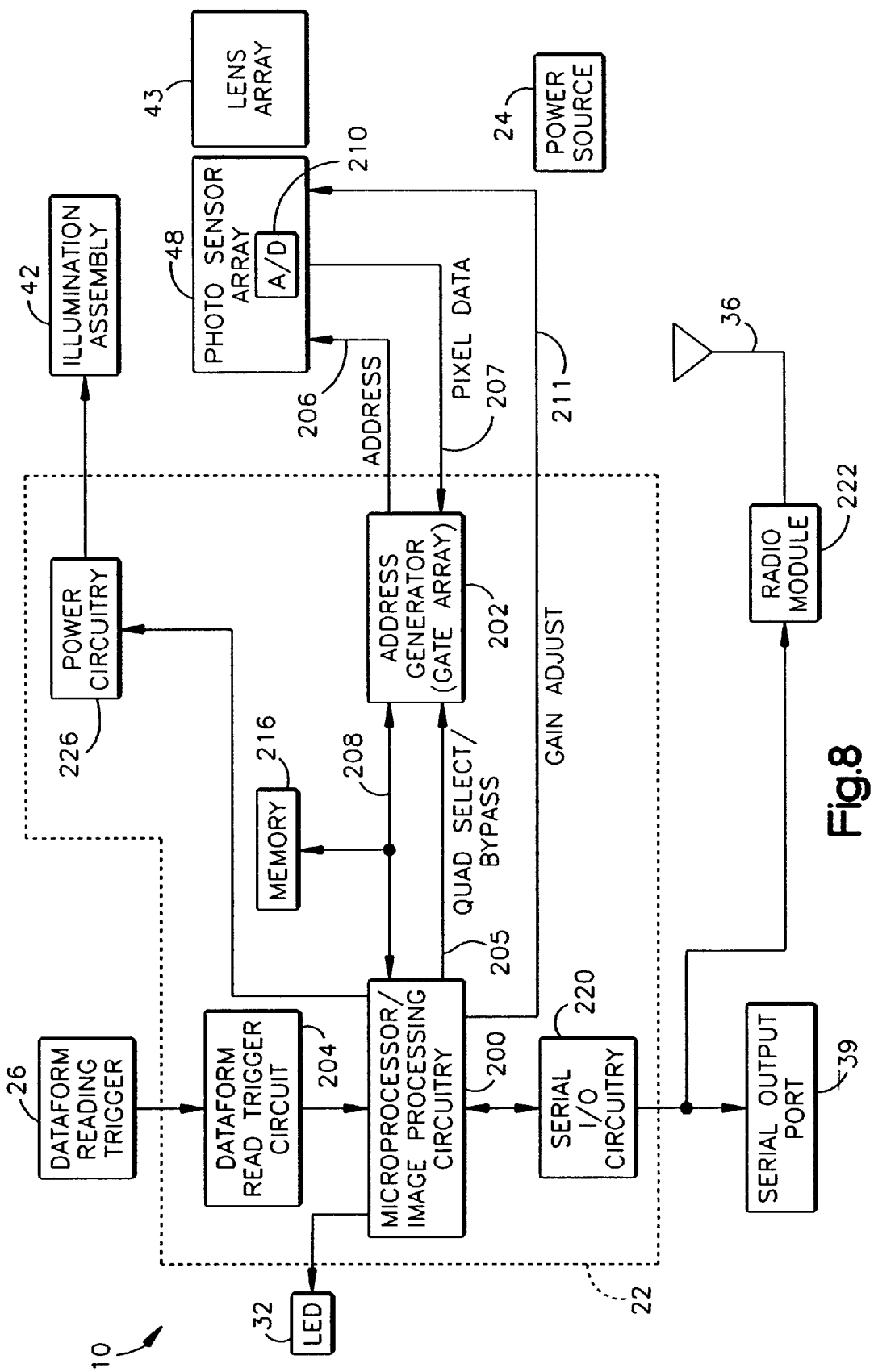
FIG. 8 is an electrical block diagram of the portable data collection device of the present invention.

FIG. 8 represents a block diagram of the data collection device 10. A microprocessor 200 controls the various operations and performs image analyses in decoding a target dataform as is described more fully below. The microprocessor 200 is programmed to carry out the various control and processing functions using conventional programming techniques. A person having ordinary skill in the art will be able to program such operations based on the disclosure herein without undue effort. Hence, additional detail is omitted for sake of brevity.

Figure 10:
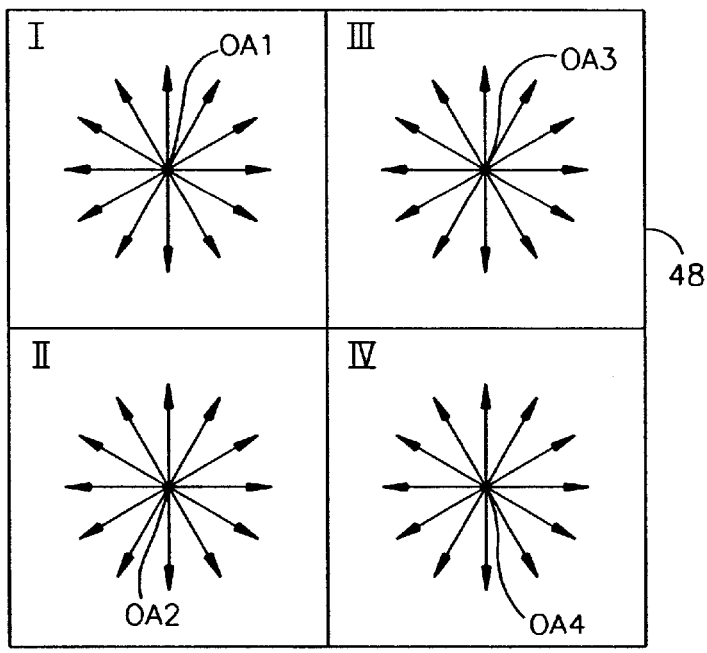
FIG. 10 is a schematic illustration showing lines along which the image data generated by the respective lens assemblies is sampled and analyzed.

The microprocessor 200 is coupled to an address generator 202, via a local bus 208, which is designed to output a sequence of pixel addresses corresponding to a star pattern in each quadrant of the photosensor array 48 as is discussed more fully below in association with FIG. 10. The microprocessor 200 is programmed to provide a quadrant select/bypass control signal to the address generator via a control bus 205. Based on the quadrant select/bypass control signal, the microprocessor 200 selects for which quadrant the address generator 202 generates pixel addresses in accordance with a predefined pattern (e.g., a star pattern). The addresses are provided from the address generator 202 to the photosensor array 48 via an address bus 206. The photosensor array 48 provides, as its output data, pixel data on data bus 207 which corresponds to the address provided on bus 206. The address generator 202 in turn provides the pixel data to the microprocessor 200 via bus 208. Data may therefore be collected from the photosensor array 48 substantially in real time according to a predefined pattern in each quadrant. The gate array address generator 202 provides a high speed means for selectively generating the addresses according to a predefined pattern (e.g., a star pattern) in each quadrant as discussed below. This allows the microprocessor 200 to engage in other computations with the received pixel data so as to increase the overall speed of the device 10, although in another embodiment all addressing may be handled by the microprocessor 200 itself.

The microprocessor 200 also is configured to provide a control signal to the address generator 202 on the control bus 205 which causes the address generator 202 to be bypassed. This allows the microprocessor 200 to provide pixel addresses directly to the photosensor array 48 via the local bus 208 during image processing as is discussed below. Also, pixel data from the photosensor array 48 is provided directly to the microprocessor 200 via the bus 208.

In order to carry out a dataform reading operation, the operator points the lens array 43 towards the target dataform. The operator then depresses the dataform reading trigger 26 having an output connected to a dataform read trigger circuit 204. The dataform read trigger circuit 204 generates an interrupt signal which is provided to the microprocessor 200 indicating the initiation of a dataform reading operation. The microprocessor 200 communicates with the address generator 202 via the control bus 205 which causes the address generator 202 to begin generating addresses for the predefined pixel pattern in a specified quadrant (e.g., quadrant I). As was described more fully above, each of the lens assemblies LA1–LA4 forms an image of the target dataform in a respective quadrant of the photosensor array 48. Each of the lens assemblies LA1–LA4 is configured so as to exhibit a different best focus distance. Thus, depending on the respective ranges suitable focus of each of the lens assemblies LA1–LA4, ideally at least one of the images formed in a respective quadrant in the photosensor array 48 will be within suitable focus while the images formed in other quadrants may not.

The address generator 202 continuously outputs the same sequence of pattern addresses for the quadrant specified by the microprocessor 200. In particular, the address generator 202 accesses the pixel data taken among pixels falling on radial sample lines (the star pattern) extending from the center of the specified quadrant as represented in FIG. 10. Such radially extending lines are selected so as to cover the expected area in which the image of the target dataform is to appear.

The image data from the photosensor array 48 consists of digital data indicative of the instantenous illumination or the pixel. In the exemplary embodiment, it is assumed that the target dataform 45*b* is made up of a series of black and white bars/spaces, dots, blocks, or the like. The photosensor array 48 includes an analog to digital (A/D) converter 210 therein for converting analog pixel data obtained from the addressed pixels to digital pixel data. The A/D converter 210 has adjustable gain which may be adjusted via a gain adjust control signal provided on line 211 from the microprocessor 200. The digitized pixel data from the photosensor array 48 is provided via the address generator 202 to the microprocessor 200. The microprocessor 200 evaluates the range of the acquired pixel data on-the-fly to see if the full range of the A/D converter 210 is utilized. If not, the microprocessor 200 adjusts the gain of the input to the A/D converter 210 and reacquires the image data along the radial lines of the selected quadrant from the photosensor array 48. Each time the microprocessor 200 acquires the respective pixel data values from the selected quadrant at a particular gain level, the microprocessor 200 generates a histogram of the pixel data for the selected quadrant as is discussed below. Upon achieving a satisfactory gain setting for the A/D converter 210 for full dynamic range, the microprocessor 200 stores in memory 216 the particular gain setting for utilizing the full range of the A/D converter 210 for the selected quadrant. In addition, the microprocessor 200 stores the relevant histogram parameters (discussed below) for the star pattern pixel data obtained from the selected quadrant at the particular gain setting. The same procedure is then repeated for each of the other quadrants until respective full range gain settings and respective histogram parameters are obtained and stored in the memory 216 for all of the quadrants.

It will be appreciated that due to the processing speed of the microprocessor 200 and the addressing by the address generator 202, the above processing of the image data provided by each of the lens arrays LA1–LA4 takes place substantially instantaneously from the perspective of the operator upon the trigger 26 being activated. Also, because the device 10 does not store the full set of image data from all of the quadrants, the memory 216 need not be particularly large; nor is there large access times associated with acquiring of all the pixel data from the 2048×2048 array.

Figure 11:
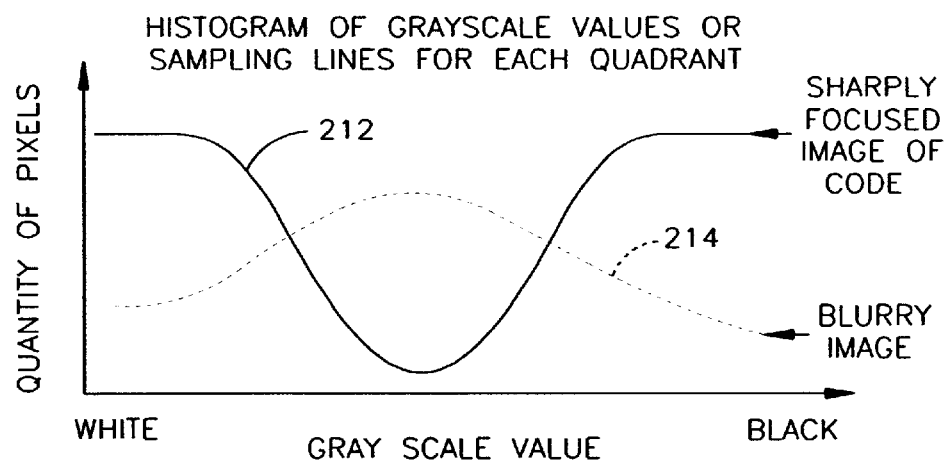
FIG. 11 illustrates exemplary histogram curves for use in accordance with the present invention in selecting image data exhibiting the sharpest focused image.

Upon receiving the histogram data from each of the respective quadrants at the appropriate gain, the microprocessor 200 then proceeds to determine which quadrant exhibits the image with the best focus. Referring to FIG. 10, each quadrant I–IV of the photosensor 48 corresponds respectively to the image formed by the lens assemblies LA1–LA4. As generally described above, for each quadrant I–IV the microprocessor 200 histogram forms a histogram from the star pattern pixel data (FIG. 10) as represented in FIG. 11. The vertical axis of the histogram represents the number of pixels from the radial sample lines in the respective quadrant. The horizontal axis of the histogram represents the gray scale value of the pixels ranging from full white to full black.

Assuming the target dataform 45*a* consists of a plurality of sharp transitions between black and white (as in the case of a bar code symbol, for example), a well focused image of the target dataform will exhibit peaks near the full white and full black regions on the histogram, with a null in between as exhibited by line 212 in FIG. 11. On the other hand, a poorly focused image of the target dataform will exhibit much higher content in the intermediate gray scale values with nulls towards the full white and full black regions as represented by line 214.

The microprocessor 200 is programmed to evaluate the histogram for each of the respective quadrants to determine which exhibits the best focused image (i.e., the sharpest null in the region between full white and full black in the histogram). Based on such evaluation, the microprocessor 200 selects the quadrant I–IV exhibiting the best focus for further processing.

Specifically, the microprocessor 200 then bypasses the address generator 202 and directly accesses the image data for the selected quadrant from the photosensor array 48. The microprocessor 200 adjusts the gain of the A/D converter 210 to be that which was associated with the selected quadrant as stored in the memory 216. The microprocessor 200 then proceeds to decode the image of the target dataform included in the selected quadrant. The particular decoding scheme may be any conventional scheme. Alternatively, the decoding may be carried out in accordance with the techniques described in the aforementioned patent application U.S. Ser. No. 08/961,096, entitled "Hand Held Dataform Reader Utilizing Binarization Process for Dataform and Signature Area Capture"; application U.S. Ser. No. 08/438,889, filed on May 10, 1995, and entitled "Oblique Access to Image Data for Reading Dataforms"; or U.S. Ser. No. 08/543,122, filed on Oct. 13, 1995, and entitled "Sub Pixel Dataform Reader with Dynamic Noise Margins". The disclosures of all of the patent applications mentioned herein are incorporated by reference.

Figure 12:
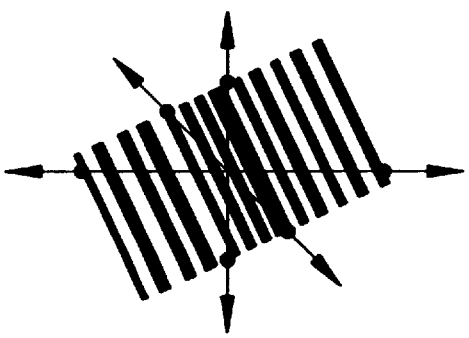
FIG. 12 is a schematic illustration showing the sample lines along which the selected image data is analyzed to locate the borders of the dataform.

As an example, the microprocessor 200 identifies the boundaries of the target dataform in the selected quadrant using techniques described in one or more of the above applications as represented in FIG. 12. Thereafter, the image data within the boundaries is processed in order to obtain the decoded information.

The microprocessor 200 then transmits the decoded dataform information to the Serial port 39 via a Serial I/O circuit 220. The Serial port 39 may be connected to a data terminal or the like. In addition, or in the alternative, the microprocessor 202 provides the decoded information to a radio module 222 included within the device housing 12. The radio module 222 proceeds to transmit the decoded information wirelessly via the antenna 36 to a base station in a wireless network, for example.

Additionally, the microprocessor 200 is coupled to the illumination assembly via power circuitry 226 which enables the microprocessor 200 to control the illumination assembly 42 to provide general illumination and targeting during operation. Finally, it is noted that the microprocessor 200 is coupled to the LED 32 to adjust its color state to exhibit the current mode of operation as mentioned above.

Figure 9:
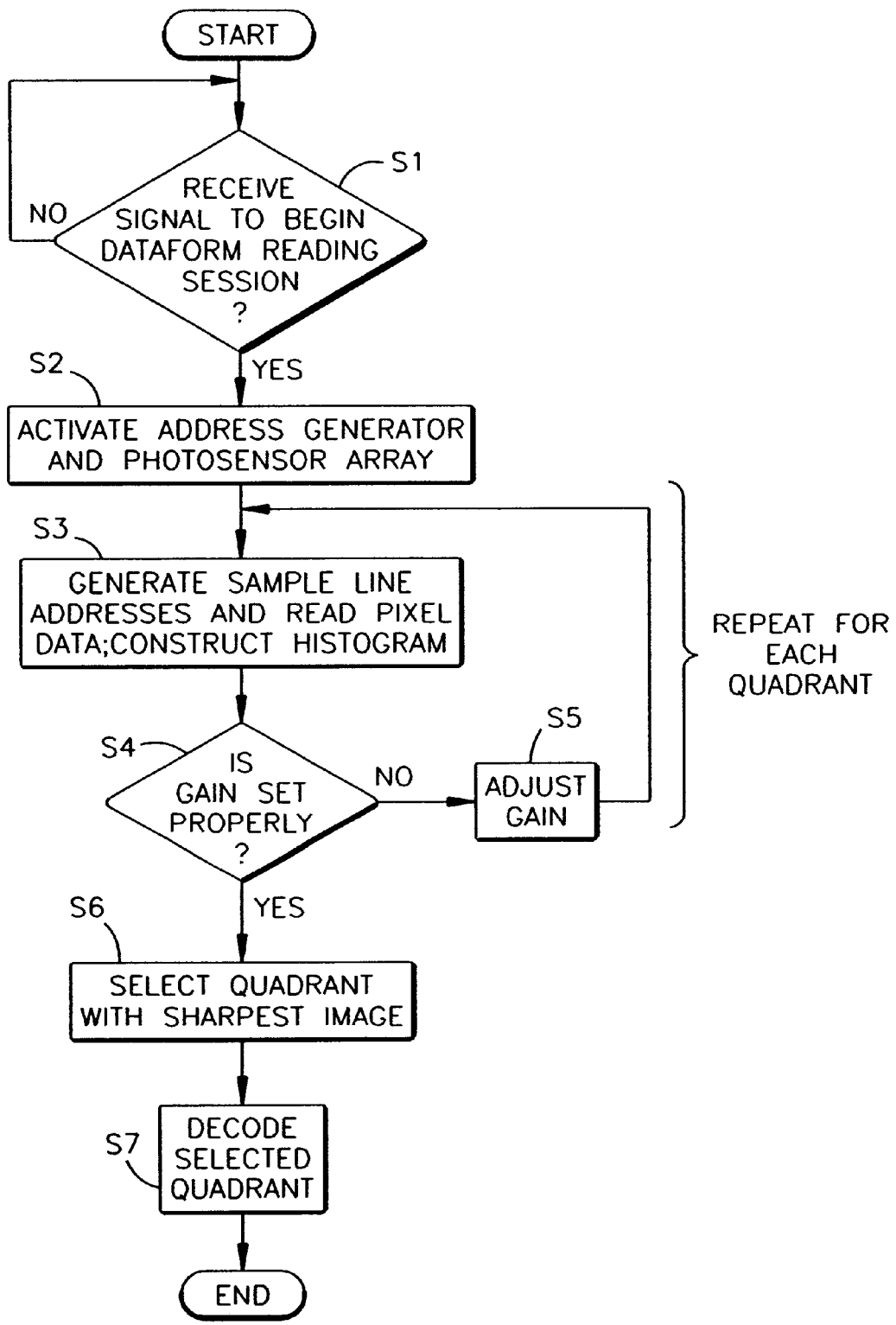
FIG. 9 is a flowchart representing the operation of the portable data collection device in accordance with the present invention.

FIG. 9 is a flowchart summarizing the above-discussed steps in carrying out a dataform reading operation. In step S1, the microprocessor 200 determines if the dataform reading trigger 26 has been activated. If no, the microprocessor continues to loop through step S1. If yes in step S1, the microprocessor 200 in step S2 activates the address generator 202 by identifying the first quadrant (e.g., quadrant I) and by providing an initial gain value to the A/D converter 210. Next, in step S3 the address generator 202 generates addresses for the pixels in the specified quadrant falling along the predefined sample lines (FIG. 10), and the microprocessor 200 in turn reads the pixel data from the photosensor array 48 and constructs a histogram for the pixel data on the same lines. Following step S3, the microprocessor 200 in step S4 determines if the gain for the A/D converter 210 is set properly for full range. Such step may be carried out by comparing the maximum and minimum pixel data values in relation to the known range of the A/D converter 210. If the gain is not sufficiently full range, the microprocessor 200 proceeds to step S5 in which it adjusts the gain. The microprocessor 200 then returns to step S3 where the data is reread from the photosensor array 48 with the new gain.

Steps S3–S5 are repeated for each of the quadrants until the appropriate gain setting and corresponding histogram for each quadrant is obtained. The microprocessor 200 then proceeds to step S6 in which the quadrant exhibiting the sharpest or best focused image is selected based on the aforementioned histograms. Following step S6, the image data for the selected quadrant is then analyzed by the microprocessor 200 and decoded in step S7.

It will therefore be appreciated that the use of multiple lens assemblies LA1–LA4 with different best focus lengths allows for the simultaneous formation of multiple images of the target dataform. The multiple images can then be analyzed to determine which provides the best focus, and the image exhibiting the best focus is then selected and decoded. Hence, the range of device 10 is extended substantially.

Although the lens array 43 has been described herein as having four different lens assemblies LA1–LA4, it will be appreciated that a different number of lens assemblies could be utilized depending on desired range, size constraints, etc. Also, in another embodiment, a single lens assembly combined with one or more optical beam splitters and mirrors for forming multiple images of the target dataform directed at different portions of the photosensor array along optical paths of different lengths may be used. The optical path lengths are adjusted such that the best focus length for each of the various images is different.

While the description has described the currently preferred embodiments of the invention, those skilled in the art will recognize that other modifications may be made without departing from the invention and it is intended to claim all modifications and variations as fall within the scope of the invention.

In compliance with the statute, the invention has been described in language more or less specific as to structural and methodical features. It is to be understood, however, that the invention is not limited to the specific features shown and described, since the means herein disclose comprise preferred forms of putting the invention into effect. The invention is, therefore, claimed in any of its forms or modifications within the proper scope of the appended claims appropriately interpreted in accordance with the doctrine of equivalents.

What is claimed is:

1. A dataform reader for reading a dataform, comprising:
    a hand-portable sized housing;
    an image assembly included within the housing, the image assembly including a plurality of lens assemblies, each of the lens assemblies being designed to image the dataform relative to a different respective best focus length from the image assembly in order to obtain a corresponding one of a plurality of sets of image data; and
    means within the housing for selecting, from among the plurality of sets of image data, by evaluating each of the plurality of sets of image data and selecting one of the sets of image data satisfying a predefined focus criteria, wherein each of the plurality of sets of image data is evaluated by sampling each of the plurality of sets of image data and selecting one of the sets of image data based on the sampled data which satisfies the predefined focus criteria.

2. The dataform reader of claim 1, further comprising means for decoding the dataform based on the selected image data.

3. The dataform reader of claim 1, wherein each of the plurality of sets of image data are obtained substantially simultaneously.

4. The dataform reader of claim 1, wherein the imaging assembly includes a photosensor array for electronically obtaining the image data formed by each of the lens assemblies.

5. The dataform reader of claim 4, wherein each of the lens assemblies is positioned at a different image distance away from the photosensor array.

6. The dataform reader of claim 4, wherein each of the lens assemblies focuses their respective image onto a different portion of the photosensor array.

7. The dataform reader of claim 4, wherein the plurality of lens assemblies comprises at least two lens assemblies.

8. The dataform reader of claim 4, wherein the plurality of lens assemblies comprises at least four lens assemblies.

9. The dataform reader of claim 4, wherein each pixel of the photosensor array is selectively addressable.

10. The dataform reader of claim 1, wherein each of the plurality of sets of image data is sampled along a predetermined pattern.

11. The dataform reader of claim 10 wherein the predetermined pattern is a star.

12. A method for reading a dataform using a portable dataform reader, comprising the steps of:
    obtaining a plurality of sets of image data of the dataform using a plurality of lens assemblies included in the dataform reader, each of the lens assemblies being designed to image the dataform relative to a different respective best focus length from the image assembly in order to obtain a corresponding one of the plurality of sets of image data;
    evaluating each of the plurality of sets of image data, wherein the step of evaluating includes sampling each of the plurality of sets of image data; and
    selecting, from among the plurality of sets of image data, image data satisfying a predefined focus criteria by selecting one of the sets of image data based on the sampled data which satisfies the predefined focus criteria.

13. The method of claim 12, further comprising the step of decoding the dataform based on the selected image.

14. The method of claim 12, wherein each of the plurality of sets of image data are obtained substantially simultaneously.

15. The method of claim 12, wherein the dataform readers includes a photosensor array and the method includes the step of electronically capturing the image data formed by each of the lens assemblies using the photosensor array.

16. The method of claim 15, wherein each of the lens assemblies is positioned at a different image distance away from the photosensor array.

17. The method of claim 15, wherein each of the lens assemblies focuses their respective image onto a different portion of the photosensor array.

18. The method of claim 15, wherein the plurality of lens assemblies comprises at least two lens assemblies.

19. The method of claim 15, wherein the plurality of lens assemblies comprises at least four lens assemblies.

20. The method of claim 15, wherein the photosensor array is selectively addressed.

21. The method of claim 12, wherein the step of selecting the image dataform among the plurality of sets of image data comprises sequentially accessing image data along a predefined pattern in each of the plurality of sets of image data, and generating a histogram concurrent with the sequential access.

22. The method of claim 12, wherein each of the plurality of sets of image data is sampled along a predetermined pattern.

23. The method of claim 22, wherein the predetermined pattern is a star.

24. The method of claim 12, wherein the step of evaluating includes generating a histogram for each of the plurality of sets of sampled image data and the step of selecting includes selecting the one set of image data with the histogram that satisfies the predefined focus criteria.

25. A method for reading a dataform using a portable dataform reader, comprising the steps of:

obtaining a plurality of sets of image data of the dataform using a plurality of lens assemblies when the portable dataform reader is positioned a given distance from the dataform, each of the plurality of sets of image data corresponding to at least one of the plurality of lens assemblies and being obtained relative to a different respective best focus length from the image assembly; and selecting, from among the plurality of sets of image data, image data satisfying a predefined focus criteria wherein the step of selecting the image dataform among the plurality of sets of image data comprises sequentially accessing image data along a predefined pattern in each of the plurality of sets of image data, and generating a histogram concurrent with the sequential access, and wherein selecting includes selecting the one set of image data with the histogram that satisfies the predefined focus criteria.

26. The method of claim 25, wherein the step of sequentially accessing image data along a predefined pattern in each of the plurality of sets of image data and generating a histogram concurrent with the sequential access includes the step of adjusting the gain of the image data if the image data does not reach a predefined gain criteria.

* * * * *

UNITED STATES PATENT AND TRADEMARK OFFICE
CERTIFICATE OF CORRECTION

PATENT NO.     : 6,318,637 B1
DATED          : November 20, 2001
INVENTOR(S)    : Paul Douglas Stoner It is certified that error appears in the above-identified patent and that said Letters Patent is hereby corrected as shown below:

<u>Column 5,</u>
Line 16, please replace "surf ace" with -- surface --.

<u>Column 7,</u>
Line 53, please replace "sphotosensor" with -- photosensor --.

Signed and Sealed this

Second Day of April, 2002

Attest:

JAMES E. ROGAN
*Attesting Officer*     *Director of the United States Patent and Trademark Office*